United States Patent
Freischlad et al.

(10) Patent No.: US 6,847,458 B2
(45) Date of Patent: Jan. 25, 2005

(54) METHOD AND APPARATUS FOR MEASURING THE SHAPE AND THICKNESS VARIATION OF POLISHED OPAQUE PLATES

(75) Inventors: Klaus Freischlad, Tucson, AZ (US); Shouhong Tang, Tucson, AZ (US)

(73) Assignee: Phase Shift Technology, Inc., Tucson, AZ (US)

( * ) Notice: Subject to any disclaimer, the term of this patent is extended or adjusted under 35 U.S.C. 154(b) by 0 days.

(21) Appl. No.: 10/393,883

(22) Filed: Mar. 20, 2003

(65) Prior Publication Data

US 2004/0184038 A1 Sep. 23, 2004

(51) Int. Cl.$^7$ .................................................. G01B 9/02
(52) U.S. Cl. ........................................ 356/503; 356/511
(58) Field of Search ........................... 356/450, 491, 356/492, 495, 511, 512, 503, 513, 514, 519

(56) References Cited

U.S. PATENT DOCUMENTS

| | | | |
|---|---|---|---|
| 4,653,922 A | 3/1987 | Jurisch | |
| 4,732,483 A * | 3/1988 | Biegen | 356/495 |
| 5,473,434 A * | 12/1995 | de Groot | 356/514 |
| 5,502,564 A | 3/1996 | Ledger | |
| 5,909,282 A | 6/1999 | Kulawiec | |
| 5,995,226 A * | 11/1999 | Abe et al. | 356/511 |
| 6,061,133 A | 5/2000 | Freischlad | |
| 6,249,351 B1 | 6/2001 | de Groot | |
| 6,480,286 B1 * | 11/2002 | Kubo et al. | 356/503 |
| 6,504,615 B1 | 1/2003 | Abe | |

* cited by examiner

*Primary Examiner*—Andrew H. Lee
(74) *Attorney, Agent, or Firm*—LaValle D. Ptak

(57) ABSTRACT

The present invention consists of a technique and device for measuring the thickness variation and shape of wafers or other polished opaque plates. A combination of two improved phase-shifting Fizeau interferometers is used to simultaneously measure the single-sided distance maps between each side of the wafer and the corresponding reference flat, with the thickness variation and shape being calculated from these data. Provisions are made to determine and eliminate the shape and tilt of the reference surfaces, and also to facilitate the correct overlay of the two single-sided measurements for the calculation of thickness variation and shape.

10 Claims, 2 Drawing Sheets

METHOD AND APPARATUS FOR MEASURING THE SHAPE AND THICKNESS VARIATION OF POLISHED OPAQUE PLATES

RELATED APPLICATION

The present application is related co-pending application Ser. No. 10/411,019 (LDP Case 4807.25, filed on Apr. 9, 2003.

BACKGROUND

Thin polished plates in the form of silicon wafers are a very important part of modern technology. The requirements for flatness and thickness uniformity of these wafers are becoming more and more stringent as the printed device feature sizes are shrinking. Therefore, the metrology of these parameters is very important for development and manufacturing. Other examples for opaque polished plates are magnetic disc substrates, gauge blocks, and the like. While the technique described here refers mainly to wafers, it is to be understood that the technique also is applicable to other types of test pieces with comparable characteristics.

There exist a variety of techniques to address the measurement of shape and thickness variation of wafers. Currently, the technique most commonly used is based on capacitive distance sensors (ASTM standards F 1530-94 and F 1390-97). For measurement, two sensors are placed near either side of the wafer and scanned together across the wafer surface, thus acquiring a distance map from each wafer surface to the corresponding capacitive sensor. From these two distance maps, the thickness variation and shape are calculated. For capacitive sensors, the achievable height accuracy and spatial resolution are limited and are no longer adequate for future wafer requirements.

A different point-sensor technique uses optical triangulation sensors for the distance measurements. While the spatial resolution is better, the height accuracy is not sufficient. In addition, the scanning time per wafer is very long for high spatial resolution.

A further technique is based on infrared interferometry using light of a wavelength where the wafer is transparent as disclosed in the U.S. Pat. No. 5,909,282 to Kulawiec, and in international patent application No. WO97/45698. One of the two interfering beams is passed through the wafer twice more than the other beam, thus producing an interferogram with a phase distribution proportional to the optical thickness variation of the wafer, which is the product of the refractive index of the wafer material and the geometric thickness. The shortcomings of this technique are that highly doped wafers are not transparent, even in the infrared and cannot be measured, and that only the thickness variation, but not the shape, is obtained.

In another technique (disclosed in the U.S. Pat. No. 5,502,564) based on multi-spectral interferometry, the wafer is placed close to a plane reference surface and is illuminated by broadband light at oblique incidence. This is done either from one side only, and only the front surface map for a chucked back surface can be determined, or from both sides, where both surface maps are measured and thickness variation and shape is obtained. The broadband nature of the light allows for obtaining the distance between the wafer surface and the reference surface by analyzing the spectral modulation of the reflected light. This technique suffers from the need to place the wafer close to the reference surface, which leads to significant difficulties in wafer handling. Furthermore, using large angles of incidence of the illumination leads in effect to a desensitizing of the measurement, thus reducing measurement precision. In addition, it is difficult to combine the two single-sided surface maps to calculate the thickness variation and shape with the necessary overlay accuracy.

Another interferometric technique using oblique incidence is described in the U.S. Pat. No. 4,653,922 to Jarisch. In this patent, the interferometric test beam is reflected at one wafer surface, and then after reflection, is directed to the second wafer surface, such that the interferogram shows the sum of both wafer surface height distributions, which is related to the thickness variation of the wafer. The drawbacks here are the requirement for optical components much larger than the wafer, a desensitizing due to the large angle of incidence, the long air path, and the lack of shape information.

Further interferometric techniques at grazing incidence are described in the German patent application disclosure to No. DE 196 02 445 A1, in U.S. Pat. No. 6,249,351 to deGroot, and in international patent application Nos. WO 00/79245 A1 and WO 01/77612 A1. In these, the wafer is illuminated from both sides at grazing incidence, where the beam splitting element and beam recombining element are diffraction gratings. Limiting the measurement precision in these systems are the desensitizing of the measurement due to the grazing incidence, the effect of air turbulence in the large non-common air path between the test and reference beams, and the difficulty to properly combine the two single-sided measurements for the thickness and shape calculations.

A double-sided interferometric technique at normal incidence is described in the U.S. Pat. No. 6,504,615 to Abe. Two Fizeau interferometers are employed to measure the shape of both wafer surfaces simultaneously, where the wafer is placed upright between the two reference surfaces. In addition to the two single-sided interferometric surface maps, the wafer thickness is measured at a set of several points, e.g. with capacitive sensors. The individual surface maps derived from the interferograms are then combined with the thickness data to obtain full wafer thickness maps. The added thickness measurements are necessary to obtain the wedge or linear thickness variation component of the wafer, which is uncertain from the interferometric measurements only, since its measurement is affected by the tilt between the two reference surfaces. This tilt is very sensitive to mechanical instability in the sub-micron level, and cannot be assumed to be sufficiently stable. The shortcomings of this technique are the need for the additional capacitive thickness measurements, and the difficulty to combine the front and back surface maps with the necessary accuracy. Furthermore, any residual shape errors of the reference surfaces, such as a sag or high frequency waviness, affects the wafer measurements and reduces their accuracy.

Another double-sided interferometer at normal incidence for the testing of magnetic disk substrates is described by K. Levotsky in *INTERFEROMETER MEASURES BOTH SIDES OF DISK, Laser Focus World*, September 1997, P. 52–53. There, the illumination is switched sequentially between the two sides of a wafer, and only one camera is used. Thus, simultaneous acquisition is not possible, which may lead to measurement errors due to a drift of the thin disk between the measurements.

The U.S. Pat. No. 6,061,133 to Freischlad discloses a low coherent noise interferometer system employing a light source useful in interferometer systems to provide improved performance.

It is desirable to provide an improved method and apparatus for rapidly measuring the thickness variation and shape of wafers, or more generally, polished opaque plates, at high accuracy levels and spatial resolution, without the aforementioned shortcomings.

SUMMARY OF THE INVENTION

It is an object of this invention to provide an improved apparatus and method for measuring the thickness variation and shape of polished opaque plates.

It is another object of this invention to provide an improved interferometric device and method for simultaneously profiling opposite sides of wafers or other polished opaque plates.

It is an additional object of this invention to provide an improved interferometer device and method for simultaneously measuring single-sided distance maps between each side of a wafer or polished opaque plate and corresponding reference flats, and calculating thickness variation and shape of the wafer from these data.

It is a further object of this invention to provide an improved interferometric apparatus and method for simultaneously obtaining two single sided distance maps of opposite surfaces of a wafer or opaque plate, along with a simultaneous measurement of the tilt of one reference flat relative to the other.

In accordance with a preferred embodiment of the invention, a method and apparatus are disclosed for measuring the thickness variation and shape of polished opaque plates, such as semiconductor wafers. This is accomplished by placing a polished opaque plate in a cavity formed between the reference flats in two interferometer channels to simultaneously map the opposite surfaces of the plate. The wavelength shifting of the light in the two channels is synchronized; and the apparatus is arranged to allow simultaneous measurement of cavity tilt of the reference flats forming the cavity. The thickness variation of the plate then is determined from the simultaneous surface mapping of the opposite surface of the plates, and the cavity tilt measurements.

In a more specific embodiment of the invention, the interferometer channels are Fizeau interferometers; and synchronization of the wavelength shifting of light is provided by utilizing a single light source, the output beam of which is split by a beam splitter to propagate the light to the two different interferometer channels. When a phase-shifting laser is used for the light source, the phase shift is fully synchronized in the light applied to both of the interferometers.

DETAILED DESCRIPTION

Figure 1:
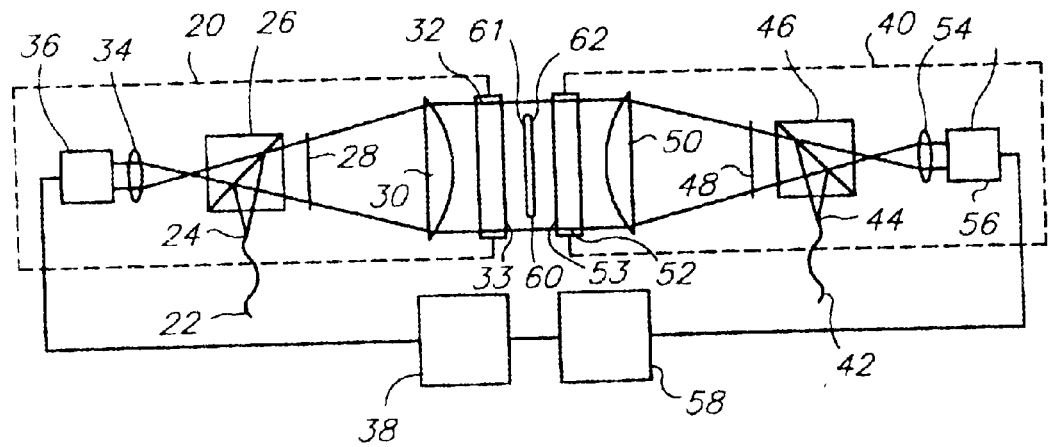
FIG. 1 is a diagrammatic representation of a preferred embodiment of the invention.

Reference now should be made to the drawings, in which the same reference numbers are used throughout the different figures to designate the same or similar components.

Prior to entering into a discussion of the drawings, however, a brief overview of some of the challenges present in providing thickness variation measurements of very thin opaque plates, such as semiconductor wafers, is considered to be in order.

Currently, semiconductor wafers for which surface mapping or profiling of the opposite surfaces is desired, along with a measurement of thickness variation over the entire wafer, requires obtaining such measurements for wafers which have a diameter between 200 mm and 300 mm with a thickness on the order of 750 microns. To obtain rapid measurements of the thickness variation and shape of such thin wafers at the highest accuracy levels and high spatial resolution, double-sided interferometric metrology with its non-contact operation, high resolution due to the short wavelength of light, and its simultaneous measurement over the whole field of view due to the inherent parallelism of optical systems, provides most of the desired features. For high measurement accuracy, however, three main issues have to be addressed.

The first issue concerns the influence of the reference surface or reference flats of the interferometer. Interferometric measurements represent only the comparison of the test beam wave front to the reference beam wave front, which means for a typical Fizeau interferometer, that the test surface is compared to the reference surface. In many cases with lower accuracy requirements, the reference surface an be taken as ideally flat and the measurement interpreted as describing the test surface only. However, for higher accuracy requirements, the influence of the reference surface has to be taken into account. In that case, the interferometric measurement is considered as the map of the distance variation between the test surface and the reference surface. In order to obtain a map of the test surface only, the shape of the reference surface must be eliminated from the measurement.

The second issue concerns the combination of two single-sided surface or distance maps to obtain the thickness variation and shape of the test part. It is very important that the maps are combined with the proper overlay, i.e. map points that truly correspond to the same wafer coordinate on the two sides of the wafer are combined. In the presence of thickness gradients or shape gradients on the wafer, an overlay error will lead to significant measurement errors for these quantities. The resultant overlay requirements typically are well below the pixel resolution of the maps. It is difficult to calibrate and maintain the mechanical stability of the interferometers to this accuracy. Thus, provisions in the interferometer are necessary to allow finding, at measurement time, the corresponding wafer coordinates in the map coordinate systems of each of the two interferometer channels in an accurate way.

The third main issue is concerned with any drift of the shape of the test piece and of the reference optics. In order to minimize the effects of shape drift, all relevant information for the calculation of thickness variation and shape should be acquired at the same time.

On overview of the preferred embodiment of the invention is shown in FIG. 1. For the wafer measurement, the wafer 60 is placed in a cavity in the center between two improved Fizeau interferometers 20 and 40, such that both wafer sides 61 and 62 are minimally obscured by the holding devices. The interferometers 20 and 40 operate in the following way: light is emitted from a light source 24,44, reflected at a polarizing beam splitter 26,46 and passes through a quarter-wave plate 28,48 aligned at 45° to the polarization direction of the polarizing beam splitter 26,46. The light is circularly polarized after the quarter-wave plate. This beam then propagates to the lens 30,50, where it is collimated with a beam diameter larger than the wafer diameter. The collimated beam then falls on the reference flat 32,52, where part of the light is reflected at the reference surface, and another part is transmitted. The central part of the transmitted beam is reflected at the test surface 61,62; and the outer part of the transmitted beam travels on to the opposite reference flat 52,32, where it is reflected at the reference surface 53,33.

Figure 2:
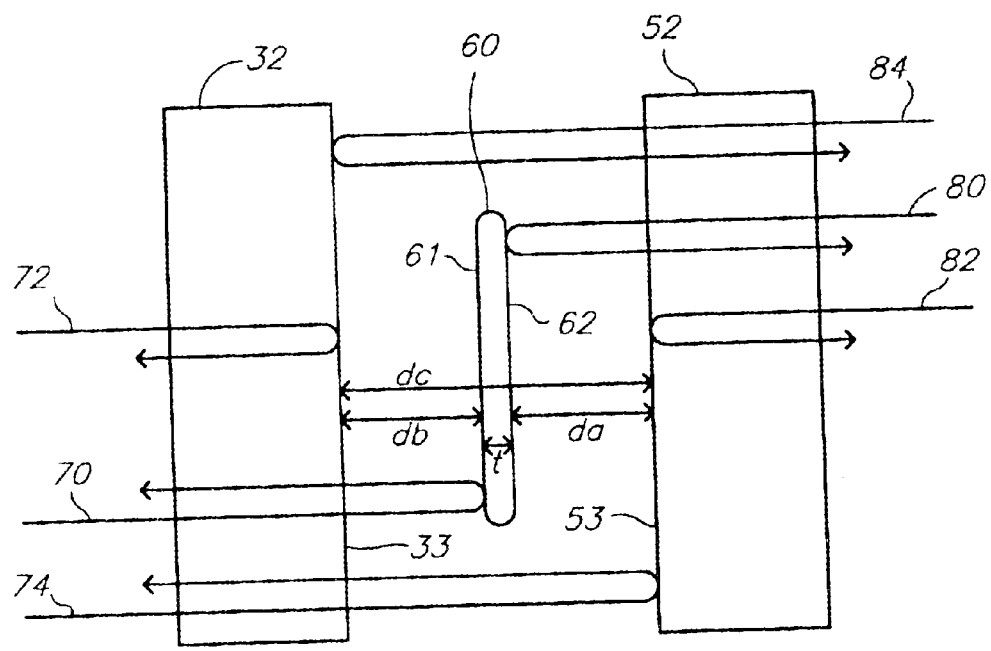
FIG. 2 is a detail of the cavity region of the embodiment shown in FIG. 1.

The interferometer test cavity is shown in more detail in FIG. 2. The light reflected at the wafer surface 61,62 constitutes the wafer test beam 70,80. The light reflected at the opposite reference surface 33,53 constitutes the cavity ring test beam 74,84; and the light reflected at the reference surface constitutes the reference beam 82,72. All three reflected beams are still circularly polarized, but of opposite handedness. They travel back through the reference flat 52,32 and through the collimator lens 50,30 to the quarter-wave plate 48,28. After the quarter-wave plate, the beams are linearly polarized with the plane of polarization of the reflected beams rotated 90° compared to the outgoing beams. When the reflected beams reach the beam splitter 46,26, they are transmitted and directed to an imaging lens 54,34, which relays the beams to a detector 56,36, where the interference patterns between the test beams (reflected from the wafer 60) and the reference beams occur.

The detector 56,36 consists of a video camera, the signal of which is digitized and further processed in a computer 58,38. The computers 58 and 38 of each interferometer channel are connected for data exchange and synchronization. Alternatively, one common computer could be used to receive the camera signals of both channels.

Figure 3:
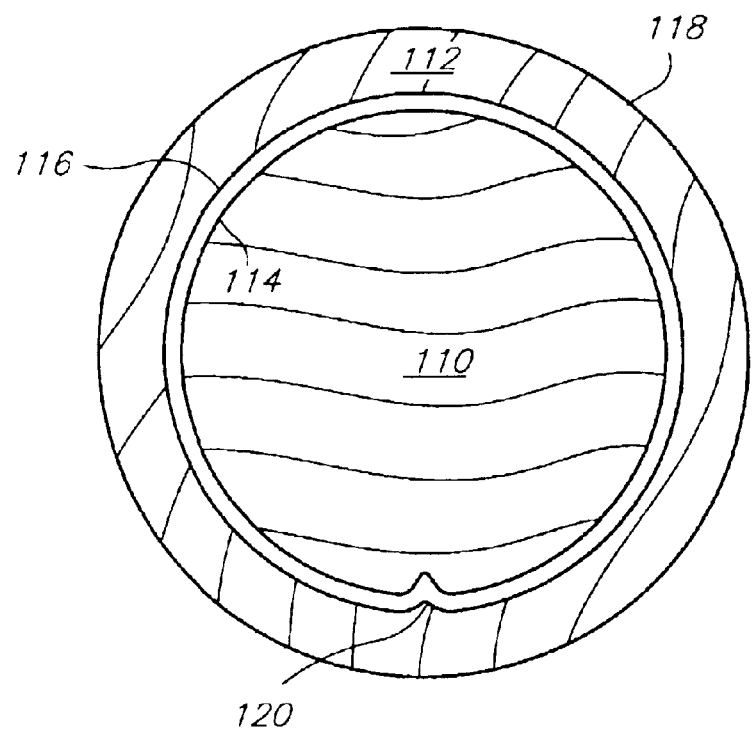
FIG. 3 is a representation of the interferogram appearance.

The data acquisition is now described in more detail for interferometer channel 40. It is obvious that the second interferometer channel 20 behaves in an equivalent way. The two reference surfaces 53,33 and the wafer 60 are substantially parallel. Thus, the interference pattern appears on detector 56, as schematically shown in FIG. 3. There is a central area 110 of interference fringes superimposed on the wafer surface, generated by interference of the wafer test beam 80, with the reference beam 82. In addition, there is an area 112 surrounding the wafer 60 with interference fringes generated by the cavity ring test beam 84 and the reference beam 82. Depending on the slopes of the wafer surfaces near the edge, there may be a zone without any interference fringes between the outer boundary 114 of area 110 and the inner boundary 116 of area 112. This zone without fringes is caused by the test beam being reflected at such high angles that it does not reach the camera 56. Hence, boundary 114 depends on the slopes of the wafer surfaces, whereas boundary 116 represents the obscuration of the opposite flat given by the true wafer edge. While the boundary 114 may be different for the two sides of the wafer, boundary 116 appears identical in the two interferometer channels 20 and 40. During the data acquisition, intensity data are recorded for the full camera field of view, such that information from the areas 110 and 112 is obtained simultaneously.

In order to obtain distance maps from the interference patterns in areas 110 and 112, a phase-shifting data acquisition method is applied. For the phase-shifting data acquisition, the phase of the interference fringes is changed in a controlled, linear fashion while several camera frames are acquired in the computer 58. Thus, for each detector element there is a sampled sinusoidal intensity signal at a certain frequency available in the computer, where the phase of this signal corresponds to the fringe phase on the detector. This signal phase, as well as the signal modulation, are extracted by phase algorithms in a very accurate and robust manner.

In order to distinguish between areas 110 and 112, the fringes in these two areas are modulated at different frequencies f1 and f2 during the phase-shifting data acquisition. A first phase algorithm is applied to the acquired camera frames, extracting only the phase and modulation of the signal at frequency f1. Then, a second phase algorithm is applied to these same acquired camera frames which extracts only the phase and modulation of the signal at frequency f2. Alternatively, the two phase algorithms can be combined into one processing step in the data analysis. Thus, the central area 110 is designated by data points with high modulation at frequency f1; and the ring area 112 is designated by data points with high modulation at frequency f2.

The phase algorithms are essentially implemented as correlations c1,c2 of the signal with two filter functions, and the phase $\phi$ is then determined by:

$$\phi = \arctan(c1/c2) \qquad (1)$$

whereas the modulation m is given by $$m = \sqrt{c1^2 + c2^2} \qquad (2)$$

The background references also show how the filter functions have a different sensitivity for different signal frequencies, and how the frequency selectivity of the phase algorithms can be achieved. A preferred arrangement consists of a phase shift of 45° between consecutive camera frames for area 110, and simultaneously, a phase shift of 90° for area 112. However, other combinations also are possible.

In the preferred embodiment of the invention, the phase shift of the interference fringes is introduced by changing the wavelength, or equivalently, the frequency of the light source. The change of fringe phase $\Delta\phi$ for a given frequency change $\Delta\nu$ is given by:

$$\Delta\phi = \frac{4\pi n L}{c} \Delta\nu \qquad (3)$$

where n is the refractive index in the test cavity between the test surface and reference surface, L is the length of the test cavity, and c is the speed of light in a vacuum. Thus, a different distance between the test and reference surfaces leads to a different phase-change per frequency shift. This is ideally suited for the test cavity shown in FIG. 2. When the wafer 60 is placed in the center between the two reference flats 52 and 32, the phase shift for the area 112 is, to sufficient accuracy, twice as large as the phase shift for the area 110.

Figure 4:
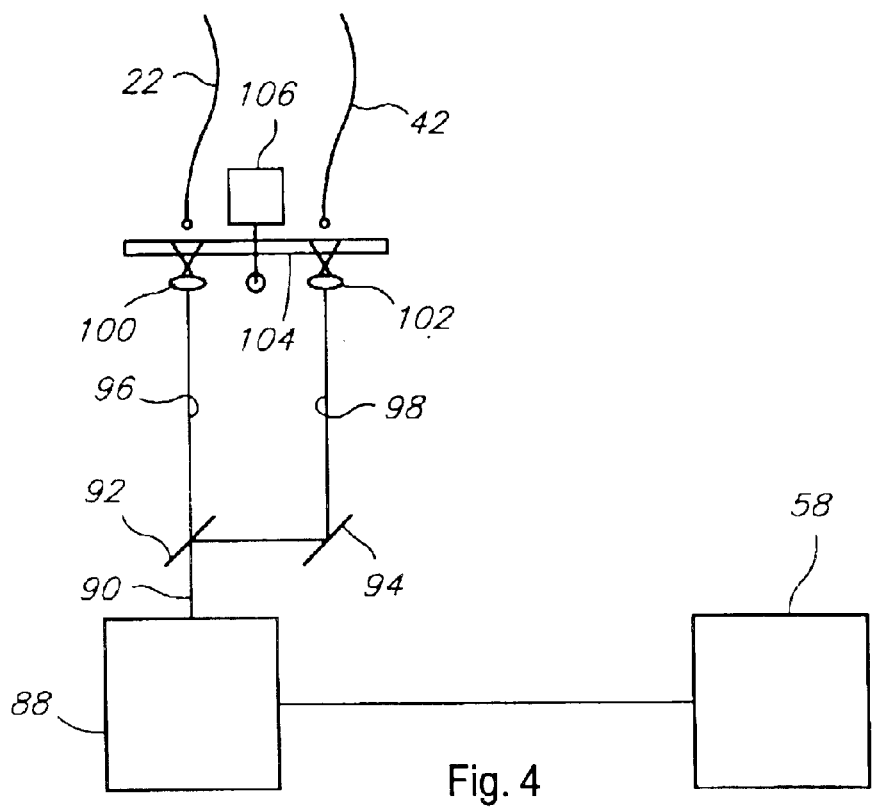
FIG. 4 is a diagrammatic representation of a light source used in conjunction with the embodiment shown in FIG. 1.

In a preferred embodiment of the invention, one wavelength-tunable laser 88 is used; and its output beam 90 is split by a beam splitter 92, as shown in FIG. 4. One beam propagates to a diverging lens 100 and creates an extended spot on a rotating diffuser 104. The other beam is directed by a mirror 94 to a second diverging lens 102, and also creates an extended spot on the diffuser 104. Two multimode optic fibers 42 and 22, in close proximity to the rotating diffuser 104, collect the light from the two spots and carry it to the two source locations 44 and 24 of the two interferometer channels 40 and 20.

The end faces of the two fibers constitute the light sources 44 and 24. They act as mutually incoherent, monochromatic extended sources according to U.S. Pat. No. 6,061,133 (the disclosure of which is incorporated herein by reference). Using incoherent extended sources has the advantage that coherent noise on the measurements is much reduced compared to a point source illumination. Naturally, it also is possible to illuminate the interferometer channels 40 and 20 with spatially coherent point sources in positions 44 and 24, with or without optical fibers, at the expense of higher coherent noise.

In an alternate embodiment, the phase shift is introduced by physically moving the reference flats in the direction parallel to the test beams, e.g. by piezo-electric actuators. The phase-shift for channel 40 in the area 110 for such physical movement is given as:

$$\Delta\phi = \frac{4\pi}{\lambda}\Delta z_a \qquad (4)$$

where $\Delta z_a$ is the position change of the reference flat 52, and for the area 112 the phase shift is:

$$\Delta\phi = \frac{4\pi}{\lambda}(\Delta z_a + \Delta z_b) \qquad (5)$$

where $\Delta z_b$ is the position change of the reference flat 32. Thus, different phase shifts are created for the different areas 110 and 112 by moving both reference flats simultaneously. In this latter case, the laser source does not need to be tunable, and either one laser with a beam splitter or two lasers can be used to illuminate the two interferometer channels 40 and 20.

For good measurement accuracy, the two single-sided distance maps between the wafer sides and the reference surfaces have to be acquired simultaneously. Otherwise, the wafer 60 may move between the two measurements, causing an error in the thickness map and shape map derived from these two single-sided maps. To obtain simultaneous measurements, the cameras 56 and 36 are synchronized to each other, and the data acquisition for both interferometer channels is carried out simultaneously, while one of the computers 58 or 38 drives the simultaneous phase shift for both channels. If one wavelength-tuned laser is used (as shown in FIG. 4), the simultaneous phase shift occurs naturally. If the two reference flats 52 and 32 are moved for the phase shift, care must be taken to ensure that they are synchronized at the required phase shift speed.

Employing extended sources 44 and 124 in the interferometer channels is essential for reducing the coherent noise on the measurements caused by light scattered at the interferometer optics. This source extent, as well as the employed overlay technique for matching the two single-sided measurements described in more detail below, necessitates that not only the wafer 60 and the two reference surfaces 53 and 33 are parallel, but also that the the direction of illumination of both channels is perpendicular to the reference flats. Thus, the outgoing beams from both channels are essentially parallel to one another, and can propagate through the opposite interferometer channel as spurious light to the opposite camera.

Spurious light from the opposite channel can severely deteriorate the data acquisition in the ring area 112. As is described below in more detail, an empty cavity map of the reference flats 52 and 32 is also acquired. For this measurement, the spurious light from the opposite channel is superposed on the whole beam diameter; and the empty cavity measurement also is deteriorated. Thus, light from the opposite channel must be prevented from reaching the camera. This is discussed for the interferometer channel 40 where the spurious light is from channel 20. The behavior for interferometer channel 20 is completely equivalent.

The spurious light suppression is achieved by setting the quarter-wave plate 48 such that the outgoing beam of channel 40 is circularly polarized with the same handedness as the outgoing beam from channel 20, i.e. both outgoing beams are either right circularly polarized or left circularly polarized after traversing the quarter-wave plate of their respective channel. After passing through the quarter-wave plate 48, the spurious beam is linearly polarized parallel to the outgoing beam from the beam splitter 46. Thus, spurious light from the opposite channel 20 is reflected by 1 the polarizing beam splitter 46 to the source, and does not reach the camera 56. The outgoing beam from the channel 40 still reaches the camera 56, since, as described above, its handedness changes upon reflection. This is true for both interferometer channels, and the two channels 40 and 20 are effectively isolated from each other.

The wafer thickness variation t(x,y) is obtained from the two single-sided distance maps da(x,y) and db(x,y), simultaneously acquired with the two interferometer channels 40 and 20 by:

$$t(x,y)=dc(x,y)-da(x,y)-db(x,y) \qquad (6)$$

where dc(x,y) is the distance map for the spacing between the two reference surfaces 53 and 33 and x,y are the coordinates in the wafer plane (FIG. 2). An equivalent equation is given by ASTM F 1530-94 for the total wafer thickness when obtained by scanning point distance sensors where the distance dc between the sensors is constant during the scan. Interferometrically, the absolute distances are not obtained, but only the distance variation without the unknown constant distance. Thus, equation (6) applies for the desired wafer thickness variation. For the double-sided interferometer, dc(x,y) represents the combined influence of the reference surfaces 53 and 33 on the single-sided measurements. Thus, applying equation (6) eliminates the influence of the reference optics; and the pure thickness variation of the test piece is obtained. For best accuracy, the empty cavity map dc (x,y) is measured simultaneously with the wafer distance maps da(x,y) and db(x,y) Since this is not directly possible, the cavity map dc(x,y) is split into two components:

$$dc(x,y)=dct(x,y)+dci(x,y) \qquad (7)$$

where dct(x,y) is the linear tilt component, and dci(x,y) is the irregularity component. The linear tilt component dct(x, y) of the cavity map is measured simultaneously with the wafer maps da(x,y) and db(x,y) in the ring area 112. This is possible due to the optical isolation of the two interferometer channels, and due to the simultaneous presence of the phase-shifted fringes in the areas 110 and 112.

The irregularity component dci(x,y) of the cavity map is given by the irregular surface shape of the two reference surfaces 53 and 33, and can be measured with the wafer 60 removed from the cavity, e.g. before loading of the next wafer. From this full irregularity map, the linear tilt component, as determined in the ring area 112, is eliminated. Thus, the combination of the tilt component simultaneously determined with the wafer maps, with the irregular component determined at a different time, represents the true empty cavity map dc(x,y) as closely as possible. This is plausible since the most likely short term drift due to environmental changes is the tilt between the two reference flats 52 and 32; whereas the actual surface shape of the reference surfaces 53 and 33 changes more slowly.

Wafers and other opaque test pieces have a high reflectance; and the interference fringe contrast is low when the reference surfaces 53 and 33 are bare glass surfaces with low reflectance. A low interference fringe contrast leads to a low signal-to-noise ratio for the phase measurement. For improved contrast in that case, the reference surfaces 53 and 33 are coated with a mixed dielectric-metal coating according to P. B. Clapham, G. D. Drew, *Surface Coated Reference Flats for Testing Fully Aluminized Surfaces by Means of the Fizeau Interferometer*, J. Sci. Instr. 44, 899 (1967). Commonly, the internal reflectance R for beam 82, the external reflectance R' for beam 84 and the transmittance T of the coating are optimized, such that there is good fringe contrast for test surfaces with high as well as low reflectance, where the external reflectance R' is minimized. For the double-sided interferometer, the reflectance R' of the coating for beam 84 is specially designed to have an appreciable reflectance, such that acceptable modulation is achieved for the full empty cavity measurement, and also for the tilt measurement in the ring area 112. A typical coating adapted for wafers has the parameters R=0.1, R'=0.04, and T=0.63.

With this type of coating, there may be a different phase change on the reflection, depending on whether the illuminating beam comes from the substrate side (as for beam 82) or the air side (as for beam 84). If this phase change difference varies across the surface due to coating non-uniformity, a spurious thickness measurement may result from equation (6). For high accuracy of the wafer measurement, this phase variation is calibrated for flats 52 and 32 in a separate step, and is eliminated from the measurements.

In order to calibrate the phase variation of a particular coated reference flat, the flat is placed in front of a Fizeau interferometer similar to 40 or 20, where in a first measurement it is in the reference flat position, and an uncoated flat with a bare glass surface is in the test piece position. A first distance map m1 is obtained from the interferometer. In a second measurement, the position of the coated flat and the uncoated flat are exchanged, such that the uncoated flat is now the reference flat and the coated flat is the test flat. A second distance map m2 is obtained from the interferometer. The difference map cc(x,y) between m2 and m1 is calculated after the mirror image reversal of map m2 has been corrected. This difference map contains only the phase effects of the coating. It is saved and combined with the irregularity component of the empty cavity map to obtain a modified irregularity component dci'(x,y):

$$dci'(x,y) = dci(x,y) - cc(x,y) \quad (8)$$

For the irregularity map dci(x,y) taken by interferometer channel 40, the coating contribution of the opposite reference surface 33 is used. If the empty cavity map dci(x,y) is acquired by interferometer channel 20, then the coating contribution of surface 53 is used. The new modified irregularity map dci'(x,y) is finally used in combination with dct(x,y) in equation (7) to obtain dc(x,y). Naturally, a mean empty cavity map can be constructed from the two empty cavity measurements taken with the two interferometer channels 40 and 20, and a mean coating contribution for the two reference surfaces 53 and 33 can be constructed and applied.

The shape of the wafer is defined as the shape of the median surface constructed from the front and back surface of the wafer. The wafer shape s(x,y) is obtained from the two single-sided distance maps da(x,y) and db(x,y) by:

$$s(x,y) = 0.5(db(x,y) - da(x,y)) \quad (9)$$

An equivalent equation is given by ASTM F1390-97 for scanning point distance sensors, where again it is assumed that the spacing between these point distance sensors does not change during the scan. In the double-sided interferometer, this is equivalent to the fact that the two reference surfaces 53 and 33 are perfectly flat. While the flatness of the reference surfaces cannot be assumed on the accuracy level typically required for the measurement of the thickness variation, it is usually sufficient for typical shape measurement requirements. Thus, the shape of the reference surfaces 53 and 33 does not need to be eliminated from the wafer shape measurements.

For both the thickness variation and the shape, the two distance maps da(x,y) and db(x,y) obtained with the interferometer channels 40 and 20 have to be combined by addition or subtraction according to equations (6) and (9). For high accuracy, it is critical that the maps are combined without any overlay error. This is accomplished by presenting an object in the test cavity to both cameras in the interferometer channels 40 and 20 where the test piece coordinate system is uniquely related to certain features of this object. Locating these features in both camera images then allows determining the transformation between the test object coordinate system and both camera coordinate systems. The two coordinate transforms are used to remap both distance maps da(x,y) and db(x,y) into the test piece coordinate system, such that they can be combined without overlay error.

The wafer itself may be used as the common object for finding the magnification and coordinate center, with the outer wafer boundary being the defining feature. If the test piece is not circular, then also the in-plane rotation, or clocking, of the coordinate system can be determined from the boundary. Wafers usually have a notch 120 as shown in FIG. 3, or a flat section to define the angular orientation. Thus, the image of the wafer boundary on both cameras is sufficient to completely define the translation, scaling, and rotation for the relative mapping of the two distance maps da(x,y) and db(x,y). If the test piece is purely circular, e.g. a magnetic disk substrate, then additional features in the field of view can be used to define the in-plane rotation between the two camera coordinate systems. For example, the mechanical holding parts of the test piece may be used for that purpose.

A common technique to determine the boundary of the test piece consists of finding the boundary of the surface area with good fringe contrast or modulation, i.e. the outer boundary 114 of the central area 110 in FIG. 3 in the case of wafers. This boundary, however, depends on the test surface shape. If the surface gradients become sufficiently large at points near the edge of the test part, as is usually the case for wafers which have a certain roll off at the edge, the test beam reflected at these points is deflected such that it does not reach the camera of the interferometer, and the fringe modulation is low or zero inside of the true wafer edge. In that case, the true boundary of the test piece is not found. Two different boundaries may be found for the two sides 62 and 61 of the test piece, especially when the details of the edge roll off are not the same on the two sides 62 and 61 of the wafer. Thus, an overlay error occurs.

The dual-sided interferometer of FIG. 1 is used to determine the true physical test piece boundary independent of the test surface shape by identifying the inner boundary 116 of the area 112 surrounding the wafer. For each camera 56 and 36, this boundary can be identified independent of the surface gradients of the wafer surfaces 62 and 61, since it depends only on the silhouette of the test piece in front of the opposite reference flat. Both reference surfaces 53 and 33 are very flat and the effect of their surface slopes on the fringe modulation is negligible. Thus, the center and scaling of the wafer coordinate systems is found. In the case of wafers, the notch 120 or flat section is used also to determine the in-plane rotation; and the wafer coordinate system is completely determined in both camera coordinate systems. In addition, mechanical wafer holding parts (not shown) obstructing the opposite reference surface in the field of view between the two reference flats may be used to better define the in-plane rotation.

The detection of the true test piece edge can be carried out using an intensity step of the opposite laser illumination, as described by T. Morimoto, *Measurement of Roll Off at Wafer Edge*, Semi-con Japan 2001. A more robust technique is based on finding the fringe modulation in area 112, as described above, using not the opposite laser, but the illumination from the same side as the wafer illumination. From the same intensity frames used for the phase shifting data acquisition for the distance measurements da(x,y), db(x,y), and dct(x,y), the fringe modulation at frequency f2 is determined according to equation (2). The inner boundary 116 of the area 112 with good fringe modulation at f2 coincides with the physical edge. In the case of wafers or other circular parts, a circle is fitted to the boundary 116 in a least-squares sense, such that all edge pixels contribute to the determination of center and scaling of the wafer coordinate system. The location of the notch 120 or flat section of the wafer is used for the in-plane rotation. Since the fringe modulation frequency is different in areas 110 and 112, the boundary 116 can be found in a robust way, whether or not there is a dark gap between boundaries 114 and 116.

With its oversized field of view, its optical channel isolation, its optimized reference surface coating, its dual frequency phase shift, and its frequency-selective phase shift and modulation decoding, the described technique provides, in one simultaneous data acquisition for both channels, all the time-critical information required to determine the thickness variation and shape of the polished opaque plates, i.e. the distance maps (da(x,y), db(x,y), and dct(x,y) as well as the necessary overlay information. In addition, the measurement of the cavity irregularity dci(x,y) is an integral part of the device. If necessary, the coating phase contribution is determined in a separate calibration step. With this combined information, a highly accurate, unbiased result for thickness variation and shape is obtained. In some instances, it also is of use to just measure the surface shape of a single side of the test piece. This capability is naturally included in the double-sided interferometer.

The foregoing description of a preferred embodiment of the invention is to be considered illustrative and not as limiting. Various changes will occur to those skilled in the art for performing substantially the same function, in substantially the same way, to achieve substantially the same result without departing from the true scope of the invention as defined in the appended claims.

What is claimed is:

1. A method for measuring the thickness variation and shape of polished opaque plates including the steps of:
   placing a polished opaque plate in a cavity formed between reference flats in two opposing interferometer channels to map the opposite surfaces of the plate;
   synchronizing the phase shifting of the interferograms in the two interferometer channels by supplying the light from a single wavelength tunable laser light source, the output beam of which is split by a beam splitter to propagate to both interferometer channels;
   measuring the cavity characteristics of the reference flats forming the cavity providing an oversized field of view of the opaque plate in the cavity for measuring the cavity tilt of the reference flats;
   determining the thickness variations of the plate from the surface mapping of the opposite surfaces of the plate and the cavity characteristic measurements; and
   blocking the recording of spurious light from one interferometer channel in the opposing interferometer channel.

2. The method according to claim 1 wherein the step of measuring the cavity tilt is a step of measuring the cavity tilt substantially simultaneously with mapping of opposite surfaces of the plate.

3. The method according to claim 2 further including the step of providing a first frequency phase shift in the interferometer channels to map the surfaces of the plate and providing a second frequency phase shift for measuring the cavity tilt of the reference flats.

4. A method for measuring the thickness variation and shape of polished opaque plates including the steps of:
   placing a polished opaque plate in a cavity formed between reference flats in two opposing interferometer channels to map the opposite surfaces of the plate;
   synchronizing the phase shifting of the interferograms in the two interferometer channels;
   measuring the cavity tilt of the reference flats forming the cavity substantially simultaneously with mapping of opposite surfaces of the plate; and
   determining the thickness variations of the plate from the surface mapping of the opposite surfaces of the plate and the cavity tilt measurements.

5. The method according to claim 4 wherein the step of measuring the cavity tilt of the reference flats forming the cavity includes providing an oversized field of view of the opaque plate in the cavity.

6. The method according to claim 5 further including the step of blocking the recording of spurious light from one interferometer channel in the opposing interferometer channel.

7. The method according to claim 6 further including the step of providing a first frequency phase shift in the interferometer channels to map the surfaces of the plate and providing a second frequency phase shift for measuring the cavity tilt of the reference flats.

8. A method for measuring the thickness variation and shape of polished opaque plates including the steps of:
   placing a polished opaque plate in a cavity formed between reference flats in two opposing interferometer channels to map the opposite surfaces of the plate;
   synchronizing the phase shifting of the interferograms in the two interferometer channels;
   blocking the recording of spurious light from one interferometer channel in the opposing interferometer channel;
   measuring the cavity characteristics of the reference flats forming the cavity; and
   determining the thickness variations of the plate from the surface mapping of the opposite surfaces of the plate and the cavity characteristic measurements.

9. A method for measuring the thickness variation and shape of polished opaque plates including the steps of:
   placing a polished opaque plate in a cavity formed between reference flats in two opposing interferometer channels to map the opposite surfaces of the plate;

synchronizing the phase shifting of the interferograms in the two interferometer channels;

measuring the cavity characteristics of the reference flats forming the cavity;

providing a first frequency phase shift in the interferometer channels to map the opposite surfaces of the plate and providing a second frequency phase shift for measuring the cavity characteristics of the reference flats; and determining the thickness variations of the plate from the surface mapping of the opposite surfaces of the plate and the cavity characteristic measurements.

10. An apparatus for measuring the thickness variation and shape of polished opaque plates including in combination:

first and second spaced apart reference flats each coated with a material producing different reflectance for light impinging on each of the first and second reference flats from opposing directions, the spaced apart reference flats forming a cavity therebetween for placement of a polished opaque plate wherein the first and second reference flats have dimensions such that an oversized field of view is provided for the opaque plate;

first and second interferometer devices located on diametrically opposite sides of the cavity to map the opposite first and second surfaces of the plate;

a light source;

means for synchronizing the phase shifting of interferograms in the two interferometer devices;

first and second interferogram detectors; and at least one computer coupled to receive the outputs of the first and second interferogram detectors for determining thickness variations of the plate.

* * * * *